Oct. 16, 1951    O. R. STRAWN    2,571,391
MECHANISM TO PREVENT JOUNCING IN MECHANICAL
VIBRATING SCREENS AND THE LIKE
Filed Jan. 3, 1949
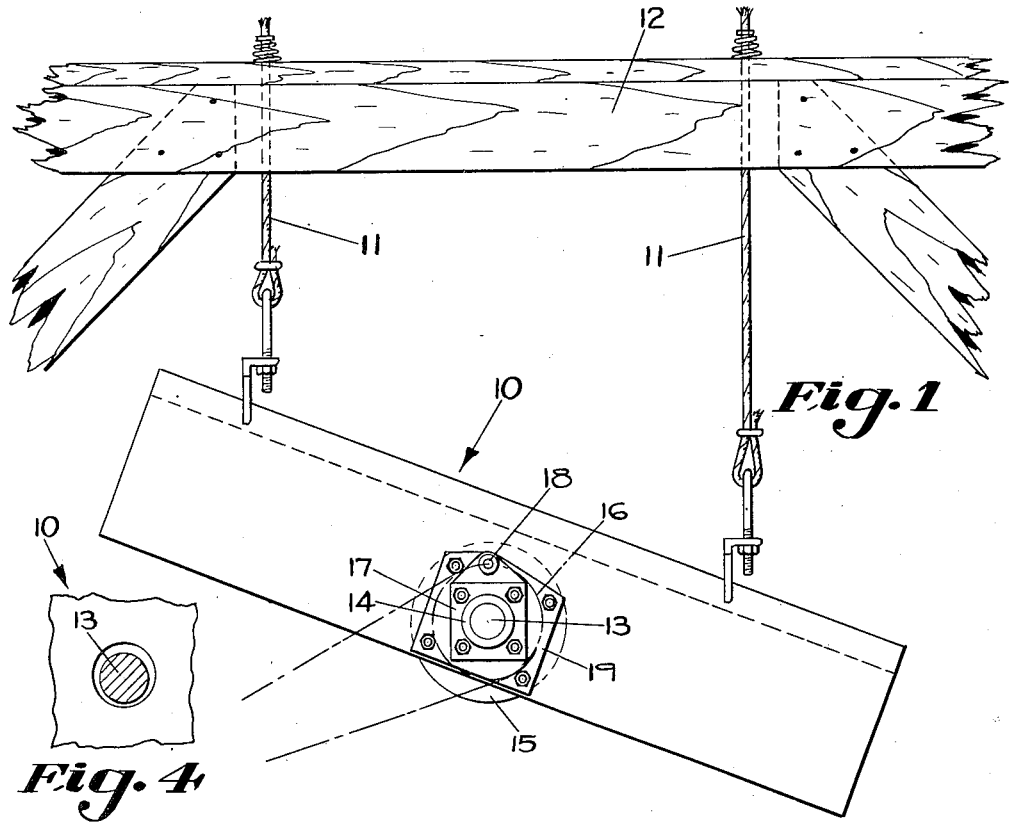
Fig. 1
Fig. 4
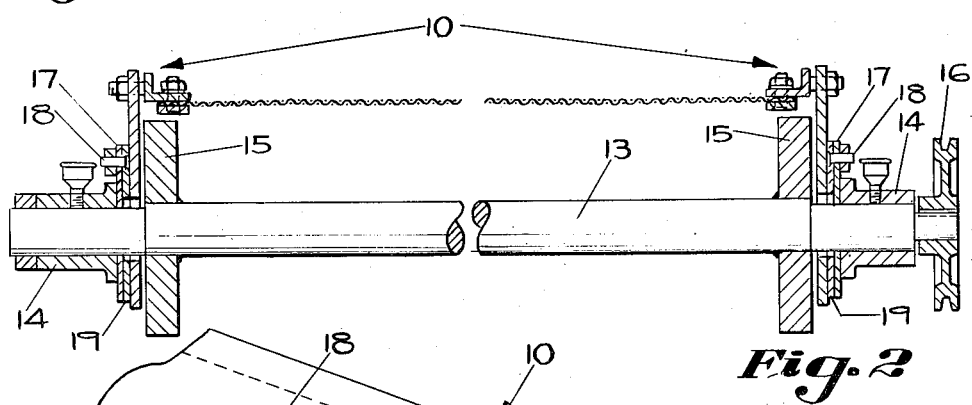
Fig. 2
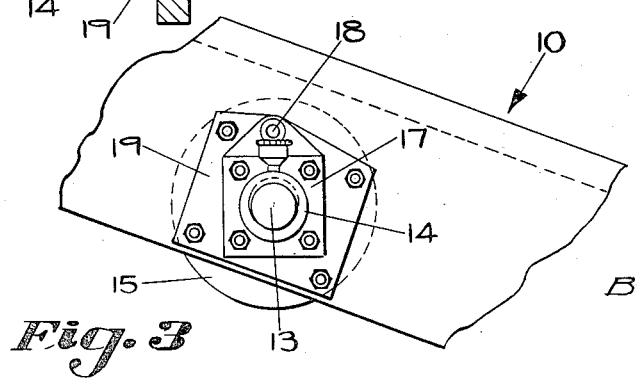
Fig. 3
INVENTOR;
ORVAL R. STRAWN,
BY
ATTY.

Patented Oct. 16, 1951

2,571,391

UNITED STATES PATENT OFFICE 2,571,391

MECHANISM TO PREVENT JOUNCING IN MECHANICAL VIBRATING SCREENS AND THE LIKE

Orval R. Strawn, Columbus, Ohio, assignor to The Jeffrey Manufacturing Company, a corporation of Ohio Application January 3, 1949, Serial No. 68,894

3 Claims. (Cl. 209—367)

1

This invention relates to apparatus for preventing or for materially reducing jouncing or violent vibration of a mechanical screen, or the like, particularly during starting and stopping thereof.

An object of the invention is to provide a very simple but highly effective apparatus of the above mentioned type, involving pivotal mounting means for connecting the rotating unbalanced weight mechanism with the screen deck, or the like.

Other objects of the invention will appear hereinafter, the novel features and combinations being set forth in the appended claims.

In the accompanying drawings,

Fig. 1 is a side elevational view of a screen and mounting means therefor, incorporating the features of my invention;

Fig. 2 is a transverse sectional view through the axis of rotation of the vibrating mechanism;

Fig. 3 is an enlarged view showing the pivotal mounting of the vibrating mechanism and the screen; and Fig. 4 is a view showing particularly the clearance between the rotating shaft of the vibrating mechanism and the screen deck.

In the illustrated embodiment of the invention there is a screen deck 10 resiliently mounted by a plurality of hangers 11 carried by a supporting structure 12. The unbalanced weight mechanism for imparting vibratory motion to the deck 10 includes a transversely extending horizontal shaft 13 having eccentric ends mounted in bearings 14 and provided with a pair of spaced unbalanced weights 15, one near each end of the shaft 13. A drive pulley 16 is provided for rotating the shaft 13 and attached unbalanced weights 15.

As is well known, when the shaft 13, carrying unbalanced weights 15. is rotated it will tend to produce circular vibration of the bearings 14 as the shaft 13 will rotate about its spin axis which is eccentric with respect to the axis of the end stubs thereof carried by said bearings 14.

Instead of rigidly connecting the bearings 14 with the deck 10, as is normal practice, each of said bearings 14 is pivotally connected with said deck 10 by carrying means in the form of a bracket 17 rigidly attached to each bearing 14, which bracket 17 is pivotally attached by a pivot pin 18 to a plate 19, which plate 19 is rigidly attached to an upright side plate or member of the deck 10.

As illustrated best in Fig. 1 of the drawings, the aligned pins 18 are on a horizontal axis

2 lying in a plane above the axis of shaft 13 and extending across the deck 10 substantially parallel to the axis of the shaft 13. In the operation of this device the deck 10 does not partake of the substantially circular motion of the bearings 14 which is produced by rotating the shaft 13 on its spin axis, but the vertical component of such circular motion is imparted to the deck 10. The horizontal component, however, merely swings the shaft 13 about the pivot pins 18.

It will be noted, particularly by reference to Figs. 2 and 4 of the drawings, that the deck 10 as well as the plate 19 has a large opening through which the shaft 13 loosely extends, which will provide for limited swinging movement of said shaft relative to said deck 10 about the axis of the pin 18. Furthermore, it has been found that this mounting very materially reduces the jouncing or violent oscillations of the deck normally involved during the starting and stopping of an unbalanced weight screen of the two bearing type.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A vibratory screen including a deck having spaced upright side plates, means mounting said deck for vibratory movement, rotary unbalanced weight mechanism for imparting vibratory movement to said deck including a shaft extending transversely of said deck and through said spaced side plates, a pair of spaced bearings, one adjacent each end of said shaft for supporting it, a bracket associated with each of said bearings, pivot means interconnecting each of said brackets and the adjacent upright side plate of said deck supporting said bearings and shaft for swinging movement about an axis above and extending parallel to the axis of said shaft.

2. A vibratory screen including a deck having spaced side members, means mounting said deck for vibratory movement, rotary unbalanced weight mechanism for imparting vibratory movement to said deck including a shaft extending transversely of said deck, a pair of spaced bearings, one adjacent each end of said shaft for supporting it, a bracket associated with each of said bearings, pivot means interconnecting each of said brackets and the adjacent side member of said deck supporting said bearings and shaft for swinging movement about an axis above and extending parallel to the axis of said shaft.

3. A vibratory screen including a deck having spaced side members, means mounting said deck for vibratory movement, rotary unbalanced weight mechanism for imparting vibratory movement to said deck including a shaft extending transversely of said deck, a pair of spaced bearings for supporting said shaft, a carrying means associated with each of said bearings for carrying it and said shaft, and a pivot means interconnecting each of said bearing carrying means and the adjacent side member of said deck, said pivot means being positioned above the axis of said shaft whereby said unbalanced weight mechanism is carried solely by said deck for swinging movement about said pivot means.

ORVAL R. STRAWN.

REFERENCES CITED

The following references are of record in the file of this patent:

UNITED STATES PATENTS

| Number | Name | Date |
|---|---|---|
| 994,659 | Schindel | June 6, 1911 |
| 1,286,617 | Hebbard | Dec. 3, 1918 |
| 1,348,770 | Allen | Aug. 3, 1920 |
| 1,991,001 | Reynolds et al. | Feb. 12, 1935 |
| 2,120,032 | Mess et al. | June 7, 1938 |
| 2,225,444 | Gary | Dec. 17, 1940 |
| 2,238,116 | Kelly | Apr. 15, 1941 |
| 2,313,765 | Parks | Mar. 16, 1943 |
| 2,358,453 | Gilson | Sept. 19, 1944 |
| 2,374,663 | Carrier | May 1, 1945 |
| 2,445,175 | Hittson | July 13, 1948 |
| 2,465,833 | Barker et al. | Mar. 29, 1949 |
| 2,512,120 | Strain | June 20, 1950 |